United States Patent
Rickman et al.

(10) Patent No.: US 6,266,468 B1
(45) Date of Patent: Jul. 24, 2001

(54) WAVEGUIDE END FACE

(75) Inventors: Andrew George Rickman, Marlborough; Arnold Peter Roscoe Harpin, Oxford, both of (GB)

(73) Assignee: Bookham Technology PLC, Abindon Oxon ( * ) Notice: Subject to any disclaimer, the term of this patent is extended or adjusted under 35 U.S.C. 154(b) by 0 days.

(21) Appl. No.: 09/118,739

(22) Filed: Jul. 17, 1998

(30) Foreign Application Priority Data

Jun. 12, 1998 (GB) .................................. 9812605

(51) Int. Cl.$^7$ ........................................ G02B 6/10
(52) U.S. Cl. ........................... 385/129; 385/132; 385/43; 385/44
(58) Field of Search ........................ 385/129, 130, 385/132, 43, 44, 50, 38

(56) References Cited

U.S. PATENT DOCUMENTS

| | | | |
|---|---|---|---|
| 5,281,305 | 1/1994 | Lee et al. .............................. | 156/657 |
| 5,485,540 * | 1/1996 | Eda ....................................... | 385/129 |
| 5,612,171 | 3/1997 | Bhagavatula ......................... | 430/321 |
| 5,719,976 | 2/1998 | Henry et al. ......................... | 385/50 |
| 5,799,119 * | 8/1998 | Rolland et al. ...................... | 385/28 |

FOREIGN PATENT DOCUMENTS

| | | | |
|---|---|---|---|
| 43 08 510 A1 | 3/1993 | (DE) .............................. | G02B/6/12 |
| 0 482 455 A2 | 10/1991 | (EP) .............................. | G02B/6/12 |
| 0 665 450 A1 | 1/1995 | (EP) .............................. | G02B/6/12 |
| 657753 | 6/1995 | (EP) . | |
| 729042 | 8/1996 | (EP) . | |
| 1525492 | 9/1978 | (GB) . | |
| 2317023 | 3/1998 | (GB) . | |
| 58-173704 | 12/1983 | (JP) .............................. | G02B/5/174 |
| WO 94/16345 | 7/1994 | (WO) . | |

OTHER PUBLICATIONS

Osamu Mitomi, "Design of a Single–Mode Tapered Waveguide for Low–Loss Chip–to–Fiber Coupling" Aug. 8, 1994, IEEE Journal of Quantum Electronics No. 8, pp. 1787–1793.

* cited by examiner

*Primary Examiner*—Darren Schuberg
*Assistant Examiner*—Fayez Assaf
(74) *Attorney, Agent, or Firm*—Roberts Abokhair & Mardula

(57) ABSTRACT

An integrated optical waveguide with an end face, the end face being provided on an end portion with a greater width than the waveguide, e.g. in the form of a T-bar provided at the end of the waveguide, whereby the rounding effect produced by the manufacturing process, e.g. etching, used to form the end face does not affect the flatness of the portion of the end face through which light is transmitted. The T-bar is preferably inclined so the normal of the end face is inclined to the optical axis of the waveguide to reduce back reflection therefrom. A plurality of waveguides may terminate in a common T-bar.

12 Claims, 1 Drawing Sheet

WAVEGUIDE END FACE

RELATIONSHIP TO OTHER APPLICATIONS:

The present application claims priority under 35 USC 119 from Great Britain application No. GB9812605.5, entitled "WAVEGUIDE END FACE" filed Jun. 12, 1998. The disclosures of the referenced application is hereby incorporated herein by reference.

1. Technical Field

This invention relates to an end face of an integrated optical waveguide and in particular to the end face of a rib waveguide formed on a silicon-on-insulator (SOI) chip.

2. Background Art

The end face of an integrated waveguide, e.g. formed of silica, may be formed by a sawing process or by mechanical polishing to achieve an optical quality facet on the end of the waveguide for coupling light to or from another component, e.g. from a laser diode or to an optical fibre. In other cases, e.g. devices made from III V materials, such as InP or GaAs, the substrate can be cleaved along a crystallographic plane to produce an optical quality facet.

With silicon waveguides, e.g. on a silicon-on-insulator chip, the facets may be fabricated by a dry etching process using well-known lithographic techniques. This enables waveguide facets to be formed at arbitrary positions on a chip. However, with waveguides typically of a width in the range 4–10 microns, the resolution limit of standard pattern definition techniques, such as lithography, tends to cause a rounding of the facet which leads to undesirable aberrations in the passage of light therethrough and/or a focusing effect on light emitted or received by the facet.

DISCLOSURE OF INVENTION

According to the present invention, there is provided an integrated optical waveguide having an end face provided on an end portion of the waveguide, the end portion being formed so that said end portion and the end face provided thereon have a width greater than the width of the waveguide leading to the end portion.

Preferred and optional features of the invention will be apparent from the following description and from the claims that follow.

BRIEF DESCRIPTION OF DRAWINGS

The invention will now be further described, merely by way of example, with reference to the accompanying drawings, in which.

BEST MODE OF CARRYING OUT THE INVENTION

Figure 1:
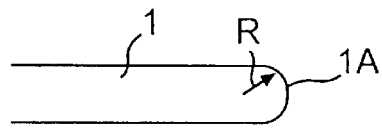
FIG. 1 illustrates a plan view of a conventional rib waveguide.

FIG. 1 illustrates a plan view of a conventional rib waveguide 1 which typically has a width in the range 4–10 microns and shows, somewhat exaggerated, the rounded form of a facet 1A formed at one end of the waveguide. The radius of the rounded corners at the edges of the facet depends on variations in the lithographic etching technique used to form the facet and so leads to variable aberrations in the transmission of light through the facet. The rounded corners may typically have a radius R in the order of 1 to 2 microns. Other waveguide manufacturing processes may also cause similar rounding effects.

Figure 2:
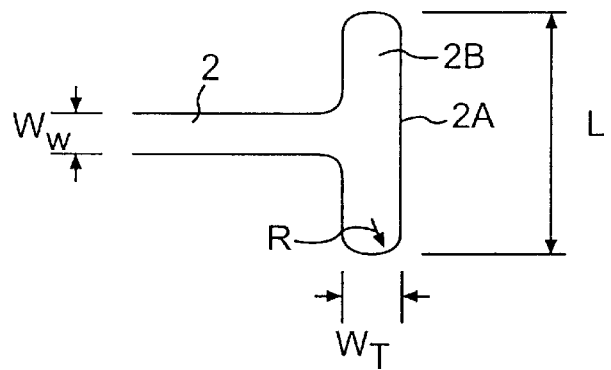
FIG. 2 illustrates a schematic plan view of an integrated waveguide according to a first embodiment of the invention.

FIG. 2 illustrates a plan view of a rib waveguide according to a first embodiment of the invention in which the end face of the waveguide 2 is provided on an end portion in the form of a "T-bar" 2B at the end of the waveguide 2. The result of this is that the end face 2A formed at the end of the waveguide is wider than the waveguide 2 leading to the end face. With a waveguide having a width Ww in the range 4–10 microns, the width of the end portion, i.e. the length L of the T-bar 2B would typically be in the range 6 to 30 microns, and in some cases up to 60 microns. The same degree of rounding of the corners of the T-bar 2B occurs as in the conventional waveguide shown in FIG. 1 but the rounded corners are now spaced away from a central portion of the end face 2A through which light passes on leaving or entering the waveguide 2. This central portion of the end face 2A can thus be formed substantially flat and the aberrations caused by the rounding effect mentioned above can be reduced or minimized depending upon the length L of the T-bar 2B relative to the width Ww of the waveguide 2.

With a waveguide 2 having a width Ww in the range 4–10 microns, the width WT of the arms of the T-bar 2B would also typically be in the range 4–10 microns.

The width of the substantially flat central portion of the end face 2A is preferably at least as great as the width Ww of the waveguide 1 so the length L of the T-bar 2B is preferably greater than the width of the waveguide by a length twice the radius R of the rounded corners, i.e. L(Ww+2R).

FIGS. 3–6 illustrate further embodiments employing the same principle, i.e. the use of a facet of greater width than the waveguide leading thereto, to reduce the aberrations caused by the rounding effect discussed above.

Figure 3:
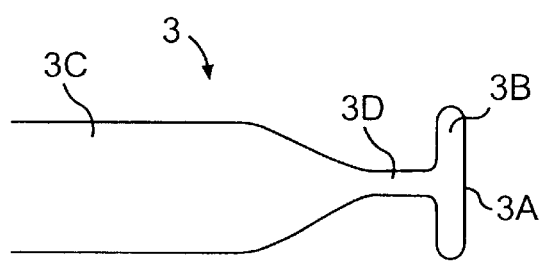
FIGS. 3, 4, 5 and 6 illustrate schematic plan views of further embodiments of integrated waveguides according to the invention.

FIG. 3 shows a waveguide 3 that tapers from a wide portion 3C to a narrow portion 3D and which is provided with a T-bar 3B on the end of the narrow portion 3D. The width of the end face 3A is thus greater than the width of the narrow portion 3D of the waveguide leading thereto.

Figure 4:
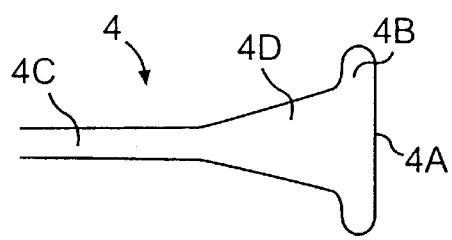

FIG. 4 shows a waveguide 4 that tapers from a narrow portion 4C to a wide portion 4D and which is provided with a T-bar 4B on the end of the wide portion 4D. The width of the end face 4A is thus still greater than the width of the wide portion 4D of the waveguide leading thereto.

It will be appreciated that the degree of rounding, i.e. the magnitude of the radius R, is defined by the manufacturing process used to fabricate the waveguide and is therefore independent of the width of waveguide. To ensure the central portion of the end face through which the light passes is substantially flat, the arms of the T-bar should each project from the sides of the end face by a distance of at least R.

Figure 5:
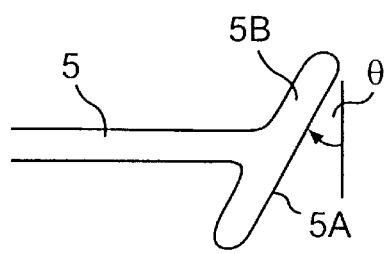

FIG. 5 shows a waveguide 5 with a T-bar 5B provided at the end thereof, the T-bar being inclined to the perpendicular to the waveguide axis. The length of the T-bar 2B shown in FIG. 2 is substantially perpendicular to the optical axis of the waveguide 2, whereas in the arrangement shown in FIG. 5, the length of the T-bar SB lies at an angle (to the perpendicular). The angle (would typically be up to 10 degrees). The end face 5A is similarly inclined so its normal lies at an angle (to the optical axis of the waveguide 5). This inclination helps avoid problems caused by back reflection of light from the face 5A interfering with light being transmitted along the waveguide 5.

With a narrow waveguide, e.g. with a width of 4 microns, the arrangement shown in FIG. 5 could not be realized without use of a T-bar as the rounding effect of the manufacturing process used to fabricate the end face would obliterate any attempt to incline the end face. Even with a wider waveguide, e.g. having a width of 6 to 8 microns, the rounding effect would significantly reduce the width of the portion of the end face which would be flat and which could thus be formed with its normal inclined to the optical axis of the waveguide.

Figure 6:
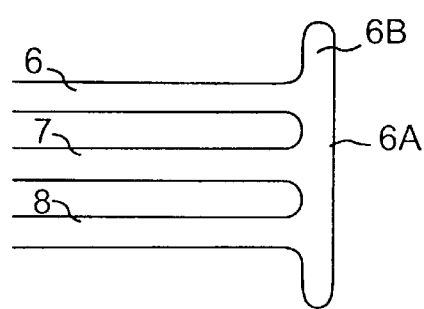

FIG. 6 shows an arrangement in which a plurality of waveguides 6, 7 and 8 lead to a common T-bar 6B. The T-bar 6B is arranged so that the end face 6A is substantially flat in the regions where light from any of the waveguides 6, 7 or 8 is transmitted therethrough.

Having thus described the basic concept of the invention, it will be readily apparent to those skilled in the art that the foregoing detailed disclosure is intended to be presented by way of example only, and is not limiting. Various alterations, improvements and modifications will occur and are intended to those skilled in the art, but are not expressly stated herein. These modifications, alterations and improvements are intended to be suggested hereby, and within the scope of the invention.

We claim:

1. An integrated optical waveguide having an end face provided on an end portion of the waveguide, the end portion being formed so that the end portion and the end face provided thereon have a width greater than the width of the waveguide leading to the end portion, wherein the end portion has a width of least Ww+2R, where Ww is the width of the waveguide leading to the end portion and R is the radius of curvature of corners of the end portion caused as a result of the manufacturing process used to fabricate the end.

2. The integrated optical waveguide of claim 1 where the end face is provided on a T-bar located at the end of the waveguide.

3. The integrated optical waveguide of claim 1 where the waveguide leading to the end face comprises a narrow portion that tapers into a wider portion towards the end portion.

4. The integrated optical waveguide of claim 1 where the waveguide leading to the end face comprises a wide portion which tapers into a narrower portion towards the end portion.

5. The integrated optical waveguide of claim 1 where a plurality of waveguides lead to a common end portion.

6. The integrated optical waveguide of claim 5 where the common end portion is provided by a common T-bar provided at the end of the waveguides.

7. The integrated optical waveguide of claim 1 in the form of a rib waveguide.

8. The integrated optical waveguide of claim 7 where the rib waveguide is formed of silicon.

9. The integrated optical wavsguide of claim 8 where the rib waveguide is formed on a silicon-on-insulator chip.

10. The integrated optical waveguide of claim 1 where Ww is in the range 4 to 10 microns and R is in the range 1 to 2 microns.

11. An integrated optical waveguide having an end face provided on an end portion of the waveguide, the end portion being formed so that the end portion and the end face provided thereon have a width greater than the width of the waveguide leading to the end portion, wherein end face is inclined so that its normal makes an angle with the optical axis of the waveguide.

12. The integrated optical waveguide of claim 11 where the angle is approximately ten degrees or less.

* * * * *